No. 793,649. PATENTED JULY 4, 1905.
R. A. FESSENDEN.
SIGNALING BY ELECTROMAGNETIC WAVES.
APPLICATION FILED MAR. 30, 1905.
6 SHEETS—SHEET 1.
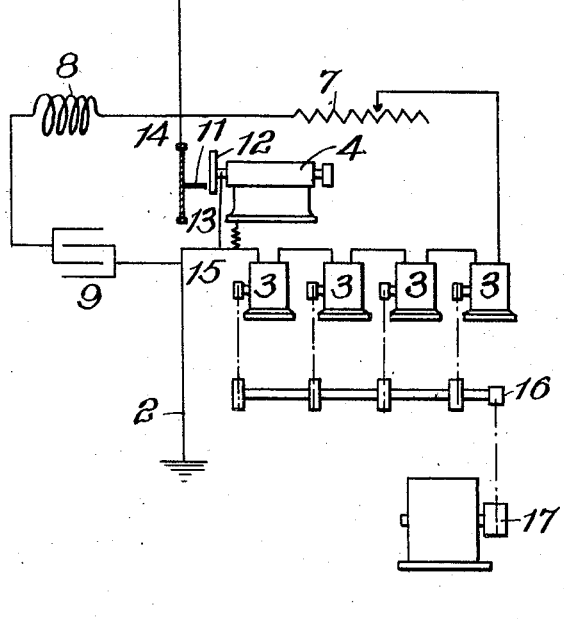
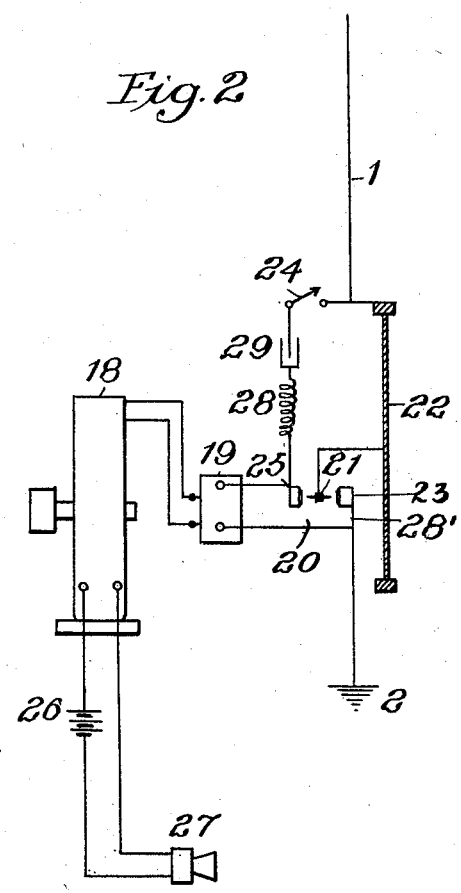
WITNESSES:
Fred Kirchner
Herbert Bradley
INVENTOR
Reginald A. Fessenden
by Dennis S. Wolcott, Atty.

No. 793,649. PATENTED JULY 4, 1905.
R. A. FESSENDEN.
SIGNALING BY ELECTROMAGNETIC WAVES.
APPLICATION FILED MAR. 30, 1905.

6 SHEETS—SHEET 2.

WITNESSES
Fred Kirchner.
Herbert Bradley.

INVENTOR.
Reginald A. Fessenden
by Darwin S. Wolcott
ATTORNEY.

No. 793,649. PATENTED JULY 4, 1905.
R. A. FESSENDEN.
SIGNALING BY ELECTROMAGNETIC WAVES.
APPLICATION FILED MAR. 30, 1905.
6 SHEETS—SHEET 3.
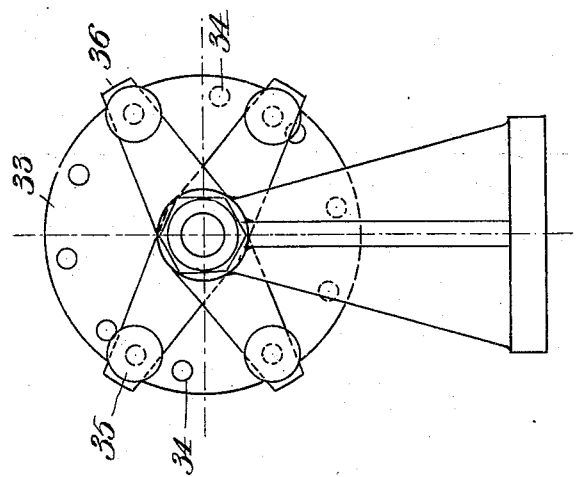
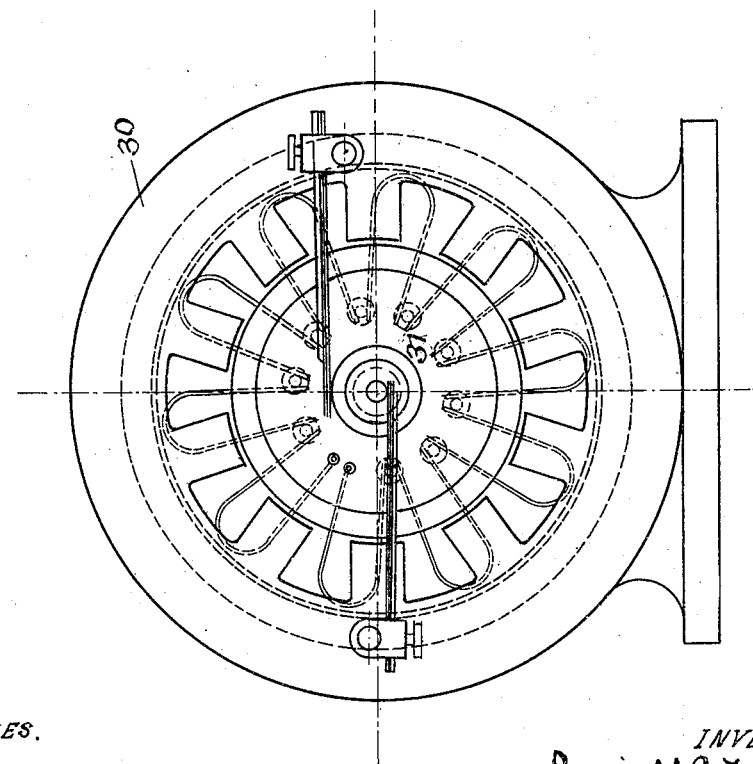
WITNESSES.
Fred Kirchner
Herbert Bradley
INVENTOR.
Reginald A. Fessenden
by Darwin S. Wolcott
ATTORNEY.

No. 793,649. PATENTED JULY 4, 1905.
R. A. FESSENDEN.
SIGNALING BY ELECTROMAGNETIC WAVES.
APPLICATION FILED MAR. 30, 1905.

6 SHEETS—SHEET 4.

Witnesses:
Fred Kirchner
Herbert Bradley

Inventor.
Reginald A. Fessenden
by Darwin S. Wolcott
Attorney.

No. 793,649. PATENTED JULY 4, 1905.
R. A. FESSENDEN.
SIGNALING BY ELECTROMAGNETIC WAVES.
APPLICATION FILED MAR. 30, 1905.

6 SHEETS—SHEET 5.

WITNESSES.
Fred Kirchner
Herbert Bradley.

INVENTOR.
Reginald A. Fessenden
by Dennis S. Wolcott
ATTORNEY.

No. 793,649. PATENTED JULY 4, 1905.
R. A. FESSENDEN.
SIGNALING BY ELECTROMAGNETIC WAVES.
APPLICATION FILED MAR. 30, 1905.
6 SHEETS—SHEET 6.
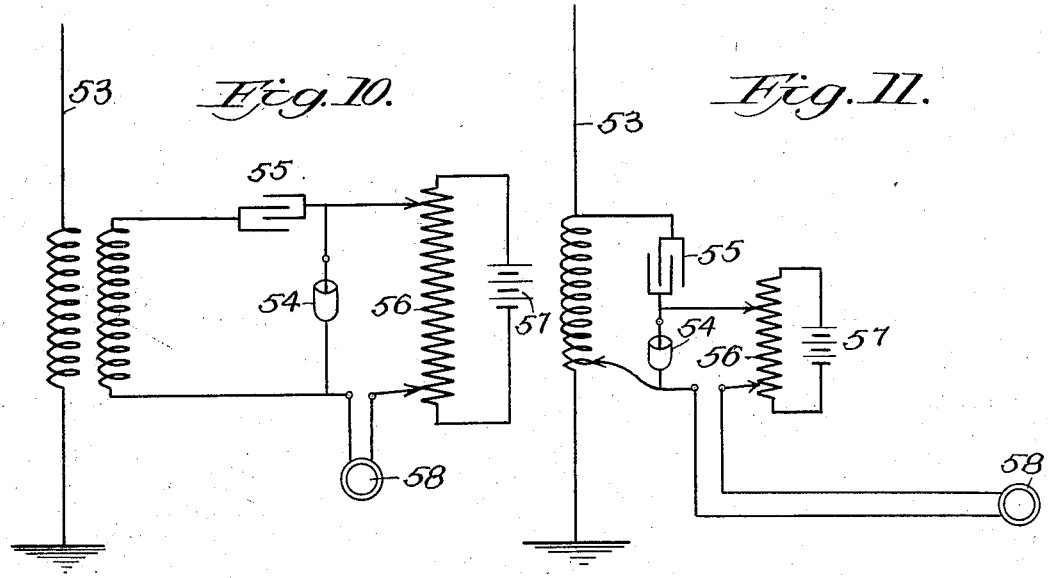
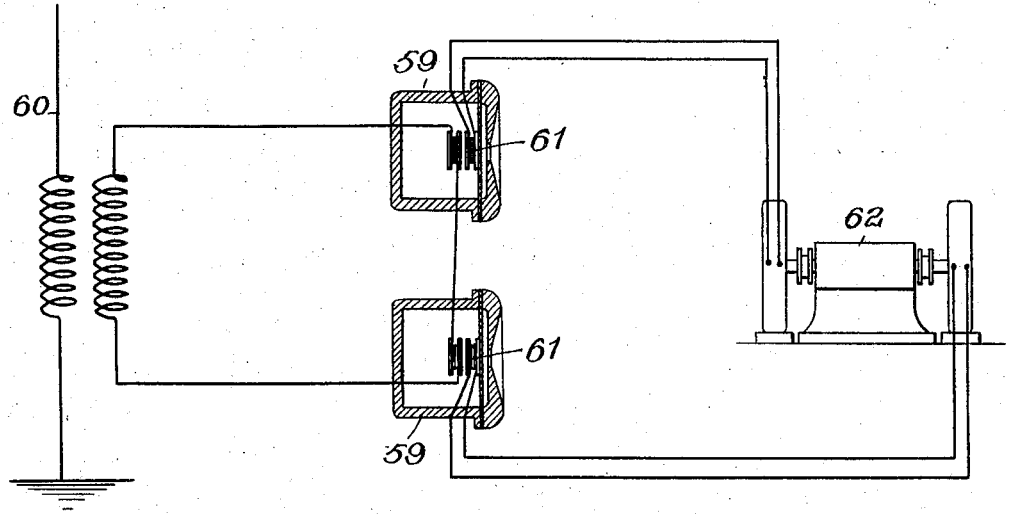
Witnesses:
Fred Kirchner
Herbert Bradley
Inventor,
Reginald A. Fessenden
by Darwin S. Wolcott
Attorney.

No. 793,649.

Patented July 4, 1905.

UNITED STATES PATENT OFFICE.

REGINALD A. FESSENDEN, OF WASHINGTON, DISTRICT OF COLUMBIA.

SIGNALING BY ELECTROMAGNETIC WAVES.

SPECIFICATION forming part of Letters Patent No. 793,649, dated July 4, 1905.

Application filed March 30, 1905. Serial No. 252,940.

*To all whom it may concern:*

Be it known that I, REGINALD A. FESSENDEN, a citizen of the United States, residing at Washington, District of Columbia, have invented or discovered certain new and useful Improvements in Signaling by Electromagnetic Waves, of which improvement the following is a specification.

The invention described herein relates to certain improvements in the generation, transmission, and receipt of energy by electromagnetic waves, but especially to controlling the generation or transmission of such electromagnetic waves, or both, by other waves or impulses, such as sound-waves.

The invention is hereinafter more fully described and claimed.

Figure 3:
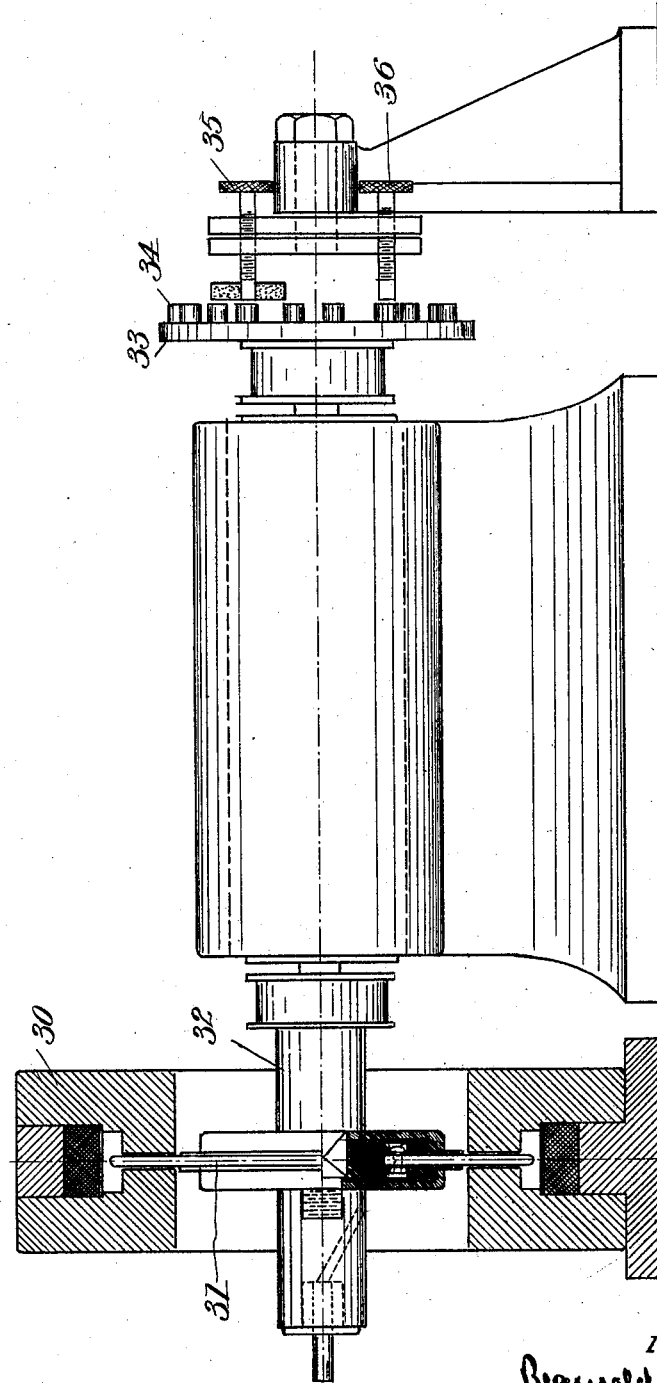
Figure 6:
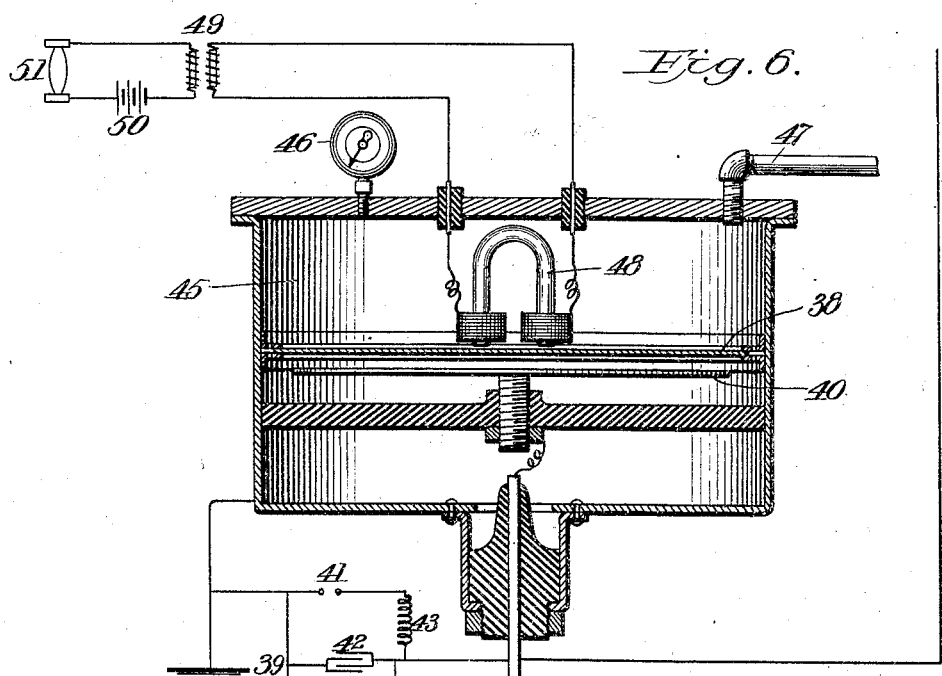
Figure 7:
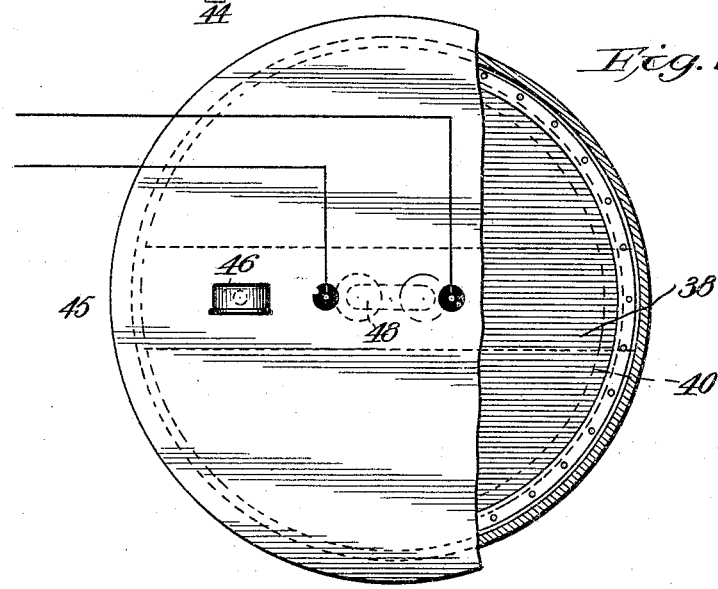
Figure 8:
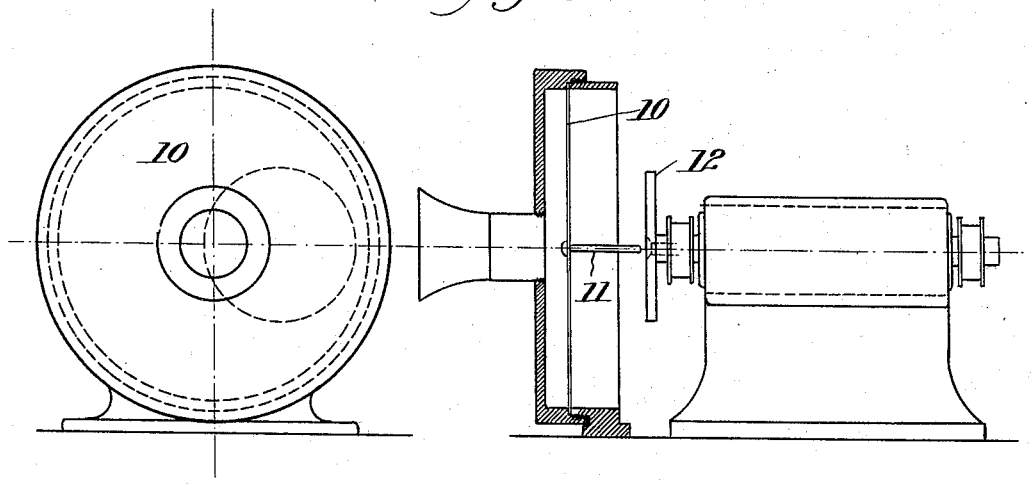
Figure 9:
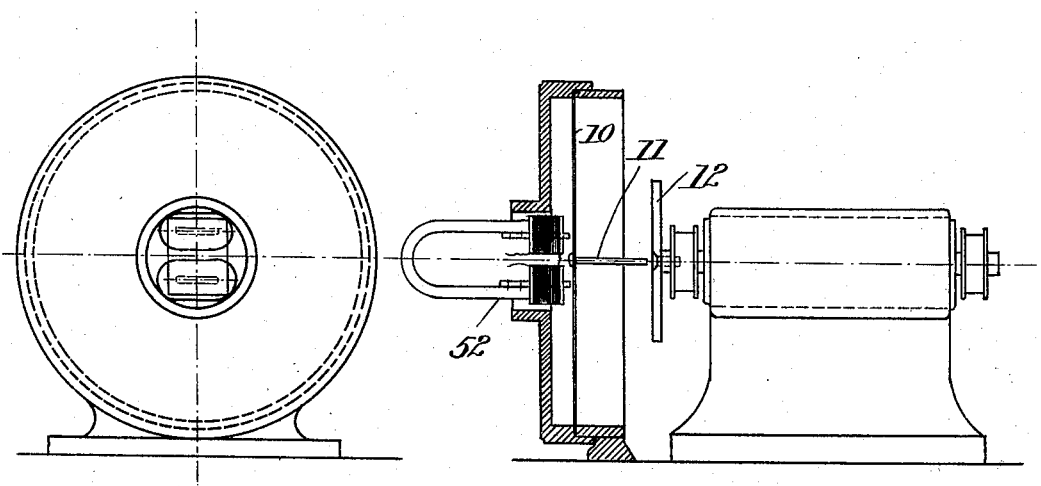

In the accompanying drawings, forming parts of this specification, Figure 1 is a diagrammatic view illustrating a combination of parts or elements for the generation, transmission, and wave control of electromagnetic waves. Fig. 2 is a similar view illustrating certain modifications. Fig. 3 is a view, partly in side elevation and partly in section, illustrating a construction of high-frequency generator; and Figs. 4 and 5 are end views thereof. Fig. 6 illustrates a manner of controlling the generation and transmission of electromagnetic waves at a central sending-station from a distant point, as a private telephone. Fig. 7 is a plan view of a controlling-condenser shown in Fig. 6. Fig. 8 shows front and sectional elevations of the spark-gap mechanism employed in Fig. 1. Fig. 9 shows similar views illustrating the spark-gap mechanism controlled by an ordinary wire telephone. Figs. 10 and 11 are diagrammatic views of receiving apparatus, and Fig. 12 is a diagrammatic view showing a double telephone-receiver in connection with a two-phase high-frequency generator.

In Fig. 1 is shown means for the generation of electromagnetic waves substantially similar to that shown in Fig. 10 of United States Letters Patent No. 706,742, the continuous-current dynamos 3 (one, two, or more in number) being driven by a suitable motor 17. When two or more generators are employed, they are arranged in series, as shown, and have their terminals connected to the sending-conductor and to ground. Suitable means are employed, as shown at 7, for regulating the flow of current from the generators. A circuit, including an inductance 8 and a capacity 9, is arranged in operative relation to the sending-conductor and spark-gap (which is grounded) for the purpose of maintaining sustained oscillations of practically constant frequency. One of the terminals 11 of the spark-gap is attached to a diaphragm 10, which for telephoning would form the diaphragm of a transmitter. This terminal is electrically connected to the conductor 1. The other terminal 8 of the spark-gap is formed by a disk 12 on the shaft of a suitable motor 4, adapted to impart a high peripheral speed, which may be as high as seven miles per second to the disk and so arranged that the sparking terminal 11 is eccentric to the axis of the disk, as shown in Fig. 8. The terminals of the spark-gap may be formed of any suitable material, as platinum, iridium, aluminium, or carbon. One of the terminals, as 11, is connected to the sending-conductor and the other to ground through a brush 13 bearing on the disk or its shaft. The circuit containing the condenser 9, inductance 8, spark-gap, brush 13, and leads 14 and 15 is preferably tuned to the period of the sending-conductor. As the sparking terminal 11 moves with the diaphragm 10 the vibration of the latter when acted on by impulses, such as sound-waves, will vary the length of the spark-gap, and the discharge of potential will be responsive to the pressure on the diaphragm. With the regulator 7 in a given position the number of discharges per second will depend upon the proximity of the discharge-terminals, and this will also influence the potential at which the condenser 9 is discharged, since the potential will depend upon the length of the spark-gap. If the circuit containing the inductance 8 and capacity 9 is tuned to the sending-conductor and the regulator 7 is adjusted to cause the number of discharges per second to be the same as the natural periodicity of the sending-conductor, the number of discharges per second, and hence the resonance, will be altered by the vibration of the diaphragm 10. On the vibration of the diaphragm, which will respond to impulses such as sound-waves, the radiation from the sending-conductor will vary in response to the sound-waves and the radiated electromagnetic waves will reproduce such vibrations in a suitable receiving apparatus—such, for example, as that shown in Fig. 11. The inductance 8 and capacity 9 may be omitted and the number of discharges per second be made as many as desired by means of the regulator 7, only the capacity and inductance of the sending-conductor being used.

In the construction shown in Fig. 2 I employ a high-frequency dynamo 18, preferably of the construction shown in Figs. 3, 4, and 5. It is preferred to employ transformer 19 in connection with such a generator in order to raise the voltage. A double spark-gap is employed, one of the terminals, as 25, being connected to the transformer and the sending-conductor, the latter connection being formed, if desired, by switch 24. The other outer terminal 23 is connected to ground and to the opposite terminal of the transformer. The intermedial terminal 21, which is electrically connected to the sending-conductor, is attached to a diaphragm 22—as, for example, the diaphragm of a transmitter. On exciting the transformer a discharge may be caused to pass from the terminal 25 to the terminal 21 and thence to terminal 23. The potential across the terminals 25 and 23 may be made to have any desired value by regulating the potential of the transformer 19 or the current flowing in the field-circuit containing battery 26 and adjusting the resistance 28. If the switch 24 be left open, the potential of the intermediate terminal 21, and therefore that of the upper portion of the sending-conductor, will vary with the position of the terminal 21, and on the vibration of the diaphragm—caused, for example, by sound-waves—the intensity of the radiation from the sending-conductor will be caused to vary in a manner corresponding to the sound-waves.

In order to overcome a scratching sometimes found in the telephone-receiver and probably caused by irregularities in the spark-discharge, the terminals in the spark-gap in the forms of apparatus shown in Figs. 1 and 2 may be adjusted. This adjustment, which includes the selection of proper material for the terminals and also regulating the size and shape of the terminals, is mainly determined by experiment to suit particular cases, depending upon the distance between the sending and receiving stations and other things. I have found aluminium, iridium, platinum, and carbon suitable materials for the terminals of the spark-gap.

The apparatus may be used for the transmission of signals, such as words, by closing the switch 24 and adjusting the terminals of the spark-gap so that no discharge passes between terminals 25 and 21, but mainly between terminals 21 and 23. This arrangement gives good results, as the radiation from the sending-conductor will vary as the gap between the terminals 21 and 23 varies with the movement produced in the diaphragm by the sound-waves. The resistance 28 may be so constructed as to form a flexible support for the terminal 25. Capacity and inductance may be arranged across the spark-gap in the same manner as shown in Fig. 1, if desired. The adjustment of the spark-gap is determined by trial, the parts being adjusted until sound is heard at the receiving end with the greatest clearness, distinctness, and loudness.

A third method of using the apparatus (shown in Fig. 2) is to employ a telephone-transmitter 27 as a resistance for regulating the field of the generator, which is preferably of small inductance. In such case the terminals 21 and 25 are brought into contact and the switch 24 opened. On speaking into the transmitter 27 the excitation of the field of the generator will vary, producing a change in the intensity of the discharge between 21 and 23 and of the electromagnetic waves emitted corresponding to the sound-waves.

A fourth method of using this apparatus is to employ a dynamo capable of producing directly in the sending-conductor the desired wave frequency—as, for example, a dynamo having frequencies up to three hundred thousand per second and capable of radiating several horse-power. In such case the terminals of the spark-gap are so separated that no discharge will pass and the switch 24 is closed. Inductances and capacities may be used in the primary or sending circuit of the transformer 19, as shown. On speaking into the transmitter 27 the field of the dynamo will be varied and the intensity of the radiation from the sending-conductor will vary to correspond with the tones of the voice. The advantages of this method are printed out in Letters Patent No. 706,747, granted to me August 12, 1902.

Several phenomena have been noticed in connection with these methods of wireless telephony which are of interest. One is that under certain conditions not yet fully understood the pitch of the transmitted speech may be raised, sometimes one octave and sometimes two octaves. This only occurs, however, with certain methods or with certain adjustments and may in most cases be obviated by altering the adjustments. It does not, however, in any case seriously affect the distinctness of the speech. A second point of interest is the extreme clearness and sharpness with which the speech is transmitted, the sound appearing at the receiving end is as if it did not come from a telephone, but from a person speaking in the room very sharply and clearly. This statement does not, however, apply to the case where a telephone-transmitter is used for varying the field excitation, as here the sound seems more like that of an ordinary telephone.

One cause of this extraordinary clearness of articulation is found in the fact that the capacity effect, which is so prejudicial to good speech, is absent in the transmission of electromagnetic waves and the higher harmonics of the voice are transmitted without distortion. There is not the slightest doubt but that the transmission of speech across the ocean is quite possible by this means.

It is found the clearness of the speech varies very considerably with the frequency of the discharges. With the apparatus described in United States Patent No. 706,747 the number of discharges was ten thousand per second. With the apparatus described in Figs. 1 and 2 a frequency of twenty thousand was generally used with a marked improvement, and there would appear to be some improvement up to as high as forty thousand discharges per second. The fact may also be noted that sound may be transmitted from a very long distance with a comparatively low potential, even the potential used in an ordinary electric lamp being sufficient for commercial work. In practice, however, in many cases it is preferable to use higher voltage—as, for example, fifty thousand volts. The reason why lower voltages are used than those commonly used in wireless telegraphy is readily seen when it is pointed out that at a frequency of ten thousand per second, corresponding to twenty thousand discharges per second, a sending-conductor of ordinary height and capacity will radiate half a horsepower. My experiments show that twenty-five miles may be considered a minimum distance to which speech may be transmitted with this energy and voltage and that there is every reason to believe that the distance really may be measured in hundreds of miles, with of course still larger distances with more power and higher potentials. This fact that it is possible to use low potentials is of considerable value inasmuch as it renders the control of comparatively large amounts of sound-waves very simple and easy, while to control a spark-discharge, such as is used for ordinary wireless telegraphy, would be very difficult. This ability to get speech over long distances is a peculiarity of the receiver described in United States Patents Nos. 706,735, 706,736, 706,744, 706,747, 715,043, 727,331, and elsewhere—i. e., current-operated cumulatively-acting receivers. In fact, it is hardly conceivable that wireless telephony should be possible without the use of receivers of this type, as these receivers differ from the imperfect contact type, in that they conserve and store up the energy of a train of discharges and produce an indication proportional to the amount of energy in the train of discharges and not an unproportional indication affected by the wave of maximum intensity which occurs in the train.

In Figs. 3 and 4 is shown a construction of high-frequency dynamo suitable for use in the apparatus shown in Fig. 2, the field being indicated at 30 and the armature at 31. On the shaft 32 of the armature is secured a disk 33, having terminals 34 mounted thereon. These terminals, which are double the number of armature-segments, are moved past by the rotation of the disk, a terminal 35, carried by a diaphragm, as in Figs. 1 and 2, or by a suitable fixed support, as shown in Fig. 3. As there are twice as many terminals on the disk as there are segments in the armature, there will be two discharges for each alternation. By the employment of additional terminals 36 and having on the disk a number of terminals 34 which shall be some multiple or submultiple of the number of armature-segments the apparatus may be arranged to operate as a selector, as described and claimed in an application filed by me. The field 30 may be caused to rotate in a direction opposite that of the rotation of the armature, thereby giving a higher frequency.

In Figs. 6 and 7 I have shown a modification of the method and apparatus illustrated in Fig. 2 of United States Letters Patent No. 706,747. The sending-conductor 1 is grounded through a condenser formed by a metal diaphragm 38 and an adjustable metal disk 39, said parts being arranged in a tank or shell 45, containing gas under pressure and forming a condenser, as described and claimed in an application for Letters Patent filed by me March 30, 1905. Suitable means are employed for generating electromagnetic waves consisting of a source 44 of high-frequency voltage and a spark-gap 41 with a capacity 42 and an inductance 43 in shunt around the spark-gap. In practice the sending-conductor, including the capacity formed by 38 and 40, is tuned to the resonant circuit 42 43 preferably when the diaphragm 38 forms the armature of the electromagnet 48, which is controlled by the telephone-transmitter 51 through the battery 50 and induction-coil 49. The condenser formed by the parts 38 and 40 may be located at any suitable place, as at a transmitting-station outside of a city, and the transmitter 51 may be the transmitter of any local telephone in the city. When the transmitter 51 is spoken into, the diaphragm 38 will be vibrated in correspondence with the sound-waves and by reason of its movement relative to the disk 40 will vary the intensity of the radiation from the sending-conductor in correspondence with the sound-waves, and the varying radiations acting on the apparatus at the receiving-station will cause a reproduction of the words spoken at the sending-station. By this combination of ordinary and wireless telephony communication between telephones now in use in widely-separated places can be readily had.

In Fig. 9 is shown means for operating the discharge-controlling diaphragm of Figs. 1 or 2 at a transmitting-station by a local-telephone transmitter. As therein shown, the diaphragm 10 is vibrated by the electromagnet 52, which, as in Fig. 6, is controlled by a local telephone transmitted through a battery and telephone induction-coil. The diaphragms 38 and 10 in Figs. 1, 2, 6, 8, and 9 to the extent to where they are operated or controlled by magnetic means may be termed "receiver-diaphragms," as they operate as the diaphragm in the receiver of a telephone.

In Figs. 10 and 11 are shown diagrammatically suitable forms of receiving apparatus, 53 being the receiving-conductor in operative relation to a receiving-circuit, including a current-operated cumulatively-acting receiver 54, a capacity 55, and potentiometer 56. A local circuit, including battery 57 and telephone 58, is controlled by the receiver 54.

Fig. 12 illustrates means for utilizing the method described in application for Letters Patent, Serial No. 222,301, filed August 26, 1904, and consisting of a double telephone-receiver 59 in operative relation to an aerial 60, excited one by one phase and the other by the other phase of a two-phase high-frequency generator 62, whereby one or the other receiver will be always active.

I claim herein as my invention—

1. In a system of signaling by electromagnetic waves the combination of means for the practically continuous generation of electromagnetic waves or impulses, a spark-gap and means for modifying or changing the intensity of the discharge across the gap without interrupting their continuity.

2. In a system of signaling by electromagnetic waves the combination of means for the practically continuous generation of electromagnetic waves or impulses, a spark-gap and means for continuously modifying or changing the intensity of the discharge across the gap without interruption of their continuity.

3. In a system of signaling by electromagnetic waves the combination of means for the practically continuous generation of electromagnetic waves or impulses, a spark-gap, and means for modifying or changing the intensity of a portion of the discharges across the gap without interruption of their continuity.

4. In a system of signaling by electromagnetic waves the combination of a sending-conductor, a spark-gap having one of its terminals in operative relation to the conductor and the other terminal grounded, a generator in operative relation to the spark-gap, and a resilient diaphragm for moving one of the terminals of the gap toward and from the other.

5. In a system of signaling by electromagnetic waves the combination of a sending-conductor, a spark-gap having one of its terminals in operative relation to the conductor and the other terminal grounded, a generator in operative relation to the spark-gap and a diaphragm responsive to waves or impulses for varying the spark-gap.

6. In a system of signaling by electromagnetic waves the combination of a sending-conductor, a double spark-gap, one of the terminals of the spark-gap operatively connected to the conductor and other terminal grounded, a generator in operative relation to the spark-gap and a diaphragm responsive to waves or impulses connected to the third terminal of the spark-gap.

7. In a system of signaling by electromagnetic waves the combination of a sending-conductor, a high-frequency generator in operative relation to the conductor and means for varying the field of the generator.

8. In a system of signaling by electromagnetic waves the combination of a sending-conductor, a high-frequency generator in operative relation to the conductor, and means controlled by a diaphragm responsive to waves or impulses for varying the field of the generator.

9. In a system for signaling by electromagnetic waves the combination of means for the practically continuous generation of electromagnetic waves or impulses at a transmitting-station and means at a local station for modifying or changing the character of such waves without interruption of their continuity operatively connected to wave-generating means at the transmitting-station.

10. In a system of signaling by electromagnetic waves the combination of means for the practically continuous generation of electromagnetic waves or impulses at a transmitting-station, means for changing or modifying the character of such waves or impulses without interruption of their continuity and means for operating the wave changing or modifying means.

11. In a system of signaling by electromagnetic waves the combination of means for the practically continuous generation of electromagnetic waves or impulses, a diaphragm-controlled means for changing the character of such waves or impulses without interrupting their continuity, said elements being located at a transmitting-station and means at a local station responsive to waves or impulses for operating the diaphragm.

12. In a system of signaling by electromagnetic waves the combination of means for the practically continuous generation of electromagnetic waves or impulses, a receiver-diaphragm for modifying the character of such waves or impulses and a transmitter electrically controlling the receiver-diaphragm.

13. In a system of signaling by electromagnetic waves the combination of a sending-conductor, a generator operatively connected to the conductor, a capacity for changing or modifying the character of radiations from the conductor, said elements being arranged at a transmitting-station and means at a local station and operatively connected to the capacity for varying the latter.

14. In a system of signaling by electromagnetic waves the combination of means for the practically continuous generation of electromagnetic waves or impulses at a main transmitting-station, means at a local station for controlling the radiations from the transmitting-station, a receiver at a main receiving-station and a local indicating mechanism controlled by the receiver.

15. As a means for the generation of electromagnetic waves the combination of a high-frequency generator and means for causing a number of electrical discharges differing from the number of segments in the armature of the generator.

16. As a means for the generation of electromagnetic waves the combination of a high-frequency generator, a disk rotating synchronously with the armature of the generator with terminals double the number of segments in the armature and a terminal relation to the path of movement of the other terminal.

In testimony whereof I have hereunto set my hand.

REGINALD A. FESSENDEN.

Witnesses:
  THOMAS P. BROWN,
  LEONA FEATHERS.